(12) United States Patent
Stamatakis et al.

(10) Patent No.: US 9,763,118 B1
(45) Date of Patent: Sep. 12, 2017

(54) SYSTEM, METHOD AND APPARATUS FOR METERING CONFIGURATION IN A WIRELESS SENSOR NETWORK

(71) Applicant: Senseware, Inc., McLean, VA (US)

(72) Inventors: Julien G. Stamatakis, Centreville, VA (US); Serene Al-Momen, Centreville, VA (US)

(73) Assignee: Senseware, Inc., Tysons, VA (US)

( * ) Notice: Subject to any disclaimer, the term of this patent is extended or adjusted under 35 U.S.C. 154(b) by 0 days.

(21) Appl. No.: 14/967,832

(22) Filed: Dec. 14, 2015

Related U.S. Application Data

(63) Continuation of application No. 14/710,209, filed on May 12, 2015.

(60) Provisional application No. 62/136,959, filed on Mar. 23, 2015, provisional application No. 61/992,307, filed on May 13, 2014.

(51) Int. Cl.
*G01D 4/08* (2006.01)
*H04W 24/02* (2009.01)
*H04W 4/00* (2009.01)
*H04W 84/18* (2009.01)
*G01D 4/00* (2006.01)

(52) U.S. Cl.
CPC ............ *H04W 24/02* (2013.01); *H04W 4/006* (2013.01); *H04W 84/18* (2013.01); *G01D 4/004* (2013.01)

(58) Field of Classification Search
CPC .............................. H04W 4/005; H04W 84/18
See application file for complete search history.

(56) References Cited

U.S. PATENT DOCUMENTS

| 5,973,594 | A | 10/1999 | Baldwin | |
|---|---|---|---|---|
| 7,113,090 | B1 | 9/2006 | Saylor | |
| 7,191,097 | B1 | 3/2007 | Lee | |
| 7,379,981 | B2 | 5/2008 | Elliott et al. | |
| 8,103,389 | B2 | 1/2012 | Golden et al. | |
| 2003/0083756 | A1 | 5/2003 | Hsiung et al. | |
| 2006/0077607 | A1* | 4/2006 | Henricks | G06Q 10/06 361/93.1 |
| 2006/0202834 | A1* | 9/2006 | Moriwaki | G01D 21/00 340/573.1 |
| 2007/0211681 | A1 | 9/2007 | Sun et al. | |
| 2007/0225954 | A1* | 9/2007 | Kodosky | G06F 8/34 703/2 |

(Continued)

OTHER PUBLICATIONS

First Action Interview Pilot Program Pre-Interview Communication, U.S. Appl. No. 14/710,209, mailed Oct. 25, 2016.

(Continued)

*Primary Examiner* — Khaled Kassim
*Assistant Examiner* — Zhaohui Yang

(57) ABSTRACT

A remote user can specify data collection and processing characteristics of a wireless sensor network. In one example, a configuration station enables a user to activate/deactivate different sensor channels of data to support a delivery of data streams to customers. In another example, a configuration station enables a user to specify reporting intervals for different sensor channels of data. In yet another example, a configuration station enables a user to specify transformation functions for different sensor channels of data. The remote configuration process can be applied to every sensor in every sensor module unit attached to every wireless node at a monitored location.

20 Claims, 12 Drawing Sheets

(56) References Cited

U.S. PATENT DOCUMENTS

| | | | |
|---|---|---|---|
| 2010/0083356 A1* | 4/2010 | Steckley | H04L 12/2818 726/5 |
| 2011/0040809 A1 | 2/2011 | Spanier | |
| 2012/0280832 A1* | 11/2012 | Jonsson | G01D 4/00 340/870.02 |
| 2014/0126581 A1 | 5/2014 | Wang | |
| 2014/0359133 A1 | 12/2014 | Tian | |
| 2015/0316945 A1 | 11/2015 | Soya | |
| 2016/0006264 A1 | 1/2016 | Alperin | |
| 2016/0112518 A1 | 4/2016 | Haleem et al. | |

OTHER PUBLICATIONS

Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
First Action Interview Pilot Program Pre-Interview Communication, U.S. Appl. No. 14/967,727, mailed Feb. 28, 2017.
First Action Interview Pilot Program Pre-Interview Communication, U.S. Appl. No. 14/862,280, mailed Mar. 8, 2017.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
Dolphin Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
iSelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Environmental Index™—Balancing Efficiency with Comfort, Automated Logic Corporation, 2013.

* cited by examiner

SYSTEM, METHOD AND APPARATUS FOR METERING CONFIGURATION IN A WIRELESS SENSOR NETWORK

This application is a continuation of non-provisional application Ser. No. 14/710,209, filed May 12, 2015, which claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a system, method and apparatus for wireless sensor network configuration.

Introduction

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
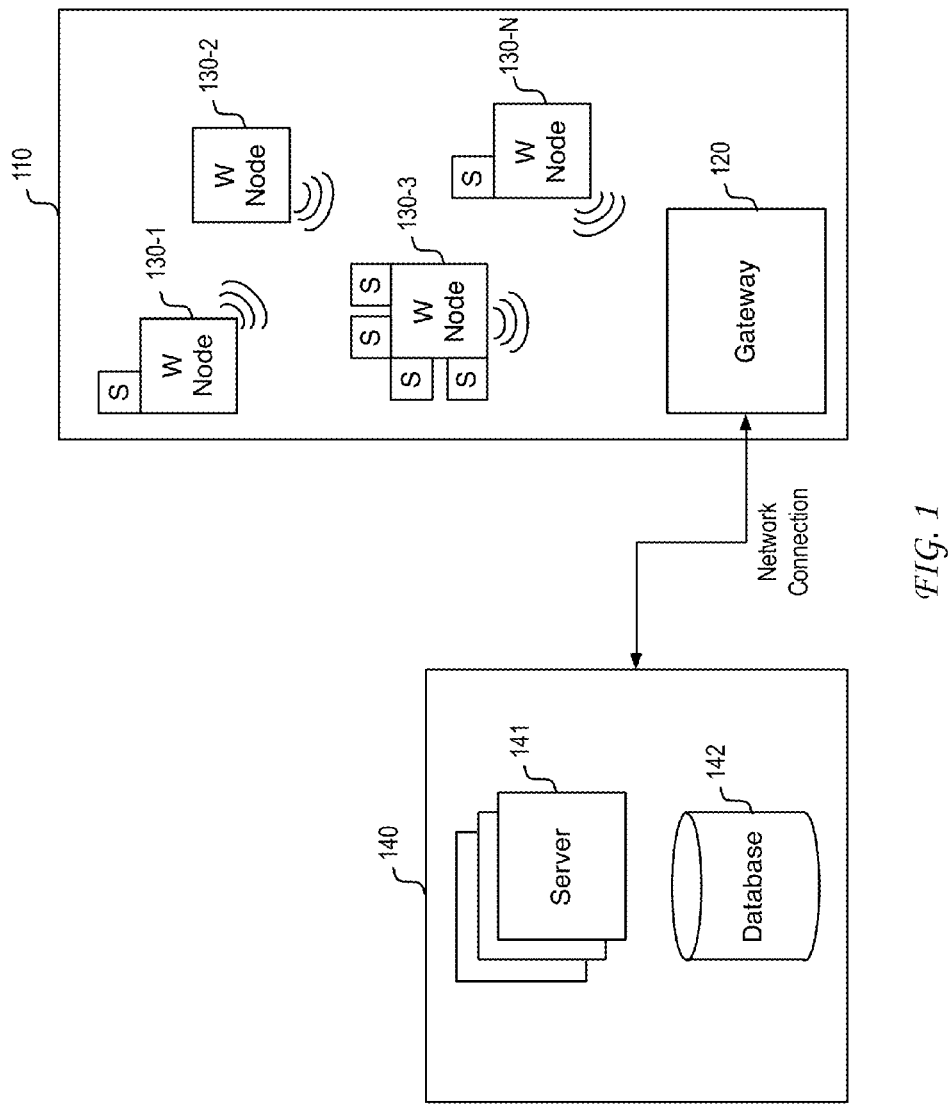
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-*n*. In general, wireless nodes 130-*n* can be configured to form a wireless mesh network. In one embodiment, the communication protocol between wireless nodes 130-*n* is based on the IEEE 802.15.4 protocol. A wireless mesh network can be formed between wireless nodes 130-*n* and can be used to facilitate communication between any wireless node 130-*n* and gateway device 120.

A wireless node 130-*n* can be configured to support one or more sensor module units (S), each of which can be individually coupled to a wireless node 130-*n* via a plugand-play universal sensor interface. The plug-and-play universal sensor interface facilitates the separation of the wireless node communication infrastructure from the set of one or more sensor module units that are deployed at the location at which the supporting wireless node 130-$n$ is installed. This separation creates significant flexibility in choice of sensors that may or may not be deployed proximate to the time of installation of the supporting wireless node 130-$n$. As such, the plug-and-play universal sensor interface enables a sensor network solution to respond to changes in the sensor application requirements at monitored location 110 without incurring significant redeployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-$n$. The plug-and-play universal sensor interface allows any type of sensor module unit to be connected to any wireless node 130-$n$ at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-$n$ can be configured to support four sensor module units. As would be appreciated, the particular number of sensor module units that can be supported by a wireless node 130-$n$ can vary. Sensor module units can be added onto wireless nodes 130-$n$ sequentially at different deployment times. Thus, for example, a first sensor module unit can be added at a time of installation of the wireless node 130-$n$, with one or more additional sensor module units added to the same wireless node 130-$n$ in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities.

If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-n facilitates communication between sensor module units and gateway 120 via the wireless network infrastructure established by wireless nodes 130-n. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
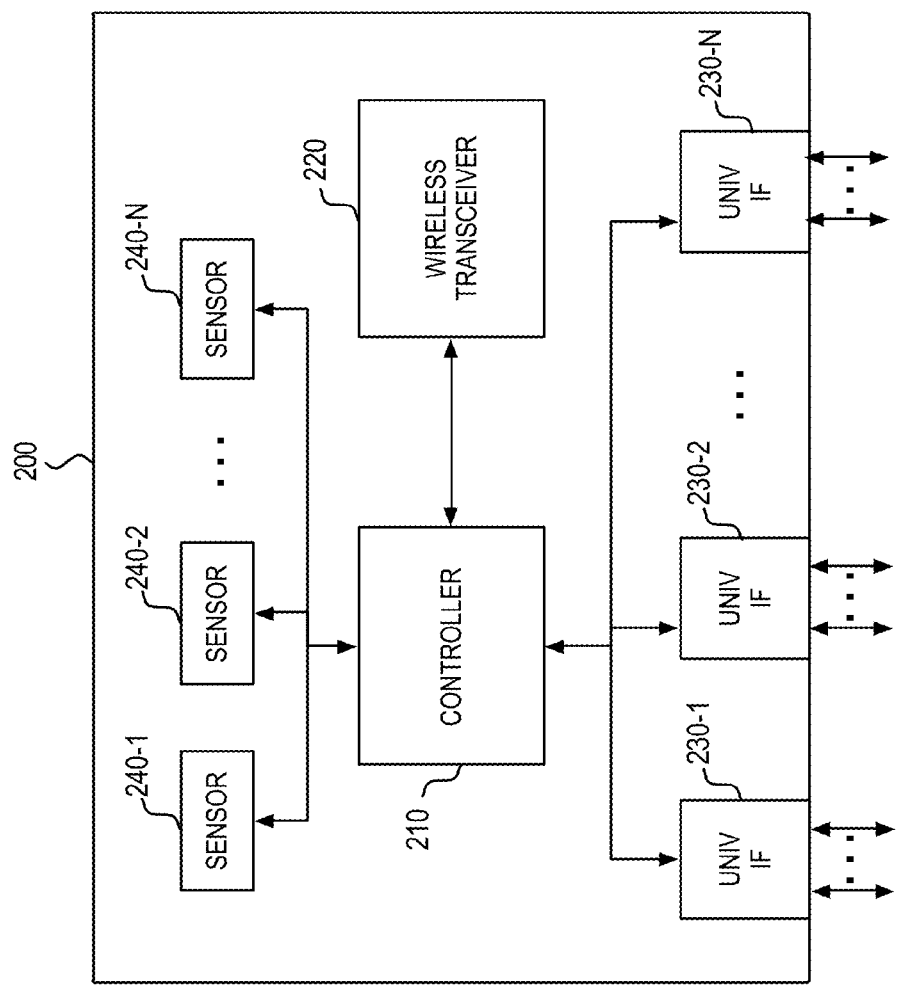
FIG. 2 illustrates an example embodiment of a wireless node.

As described, wireless nodes 130-n provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-n. Each universal sensor interface 230-n can support connection of wireless node 200 with a separate sensor module unit that can be attached to wireless node 200.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-n can include a protocol that allows wireless node 200 to communicate with a sensor module unit.

In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

Figure 3:
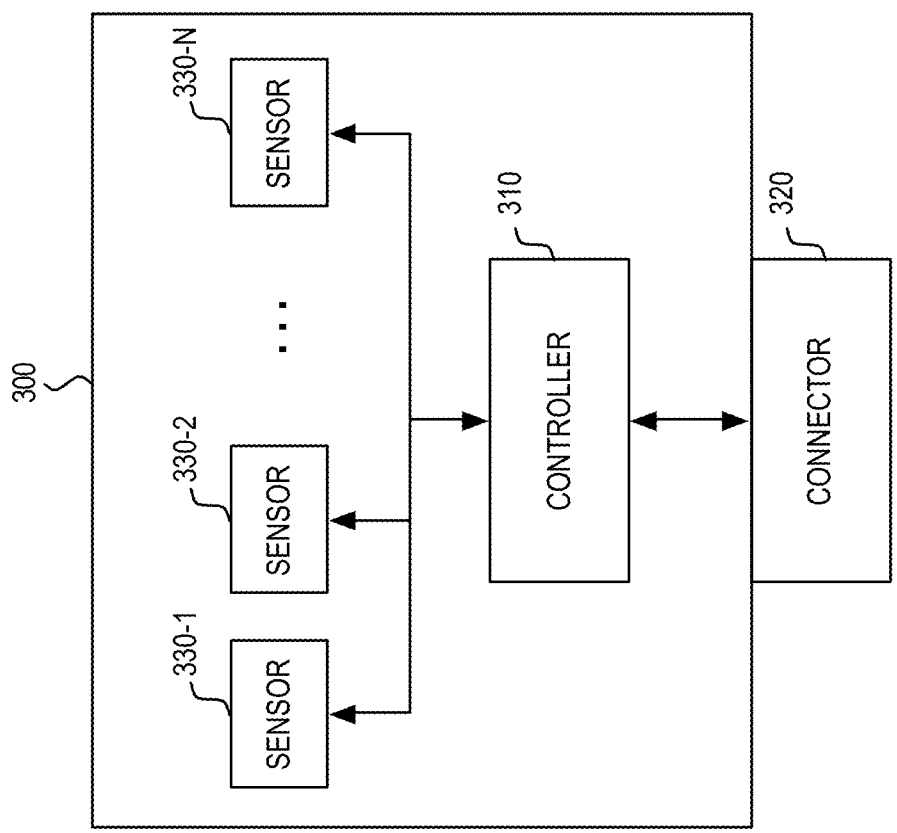
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-*n*. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second sensor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
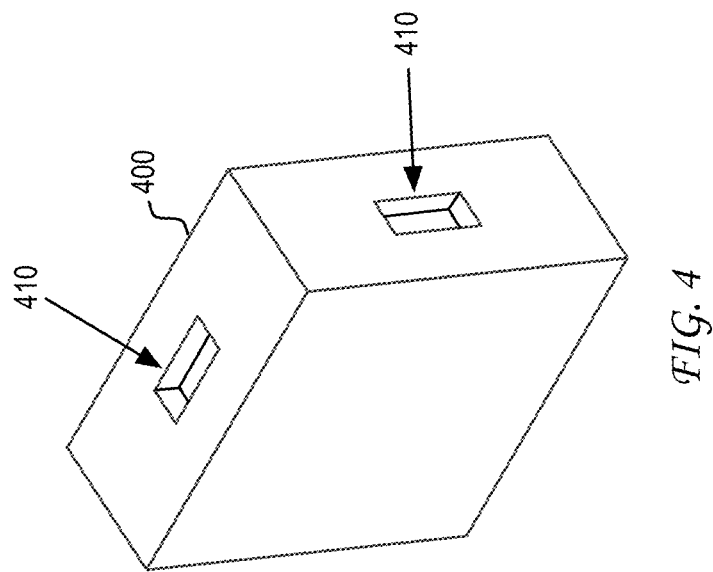
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
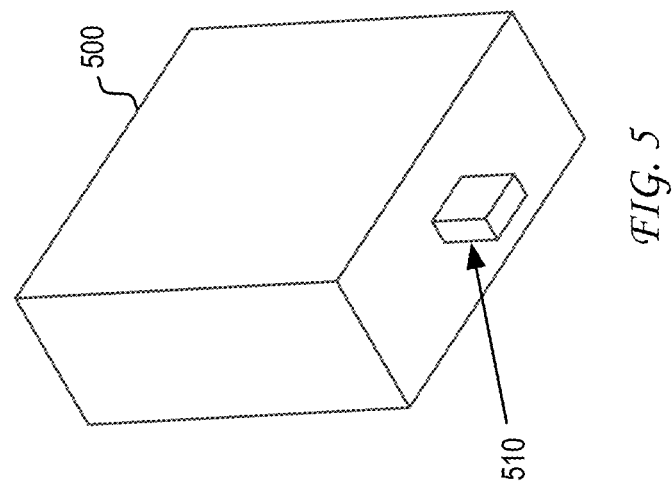
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
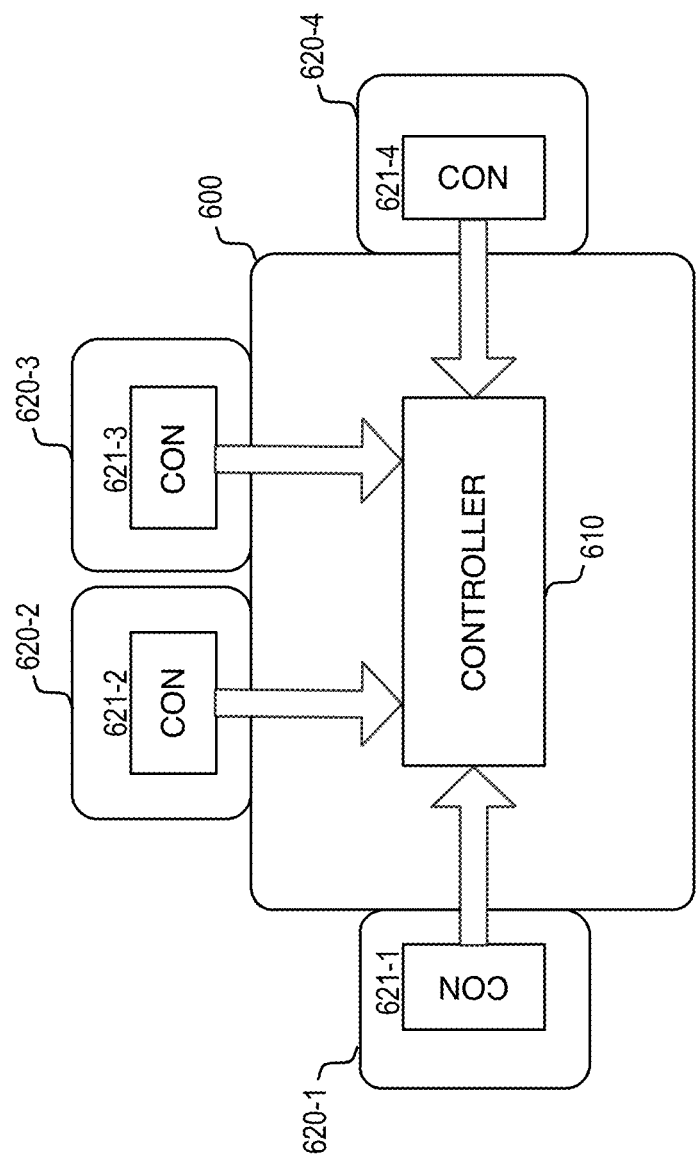
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-*n* to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610.

In one embodiment, a sensor module unit can be configured to transmit data from only a subset of the sensors on the sensor module unit. To illustrate this embodiment, consider again the example of a sensor module unit targeted for school building use. In this example, the sensor module unit can include a standard suite of eight sensors, including four pulse sensors for measuring utility consumption (e.g., gas, water, electricity), a temperature sensor, an air quality sensor, a humidity sensor and a light sensor. Individual sensors in this standard suite of sensors can be activated selectively such that only a subset of the sensor channels of data is forwarded from the sensor module unit to the wireless node.

Here, it is recognized that the selective transmission of sensor channels of data can be used to support efficient wireless bandwidth use or reduced power consumption within the wireless sensor network at the monitored location. Moreover, the selective transmission of sensor channels of data can support a billing model where customers pay per sensor channel stream of data that is exposed by the host system to the customer. Additionally, customization of a sensor module unit after installation enables remote customization, which thereby lowers the cost of installation and maintenance incurred by personnel responsible for configuring the wireless sensor network at the monitored location. As would be appreciated, this aspect of configuration can be designed to reduce the amount of pre-installation customization required in setting up sensor module unit 620-*n* to operate with wireless node 600 at the monitored location.

Figure 7:
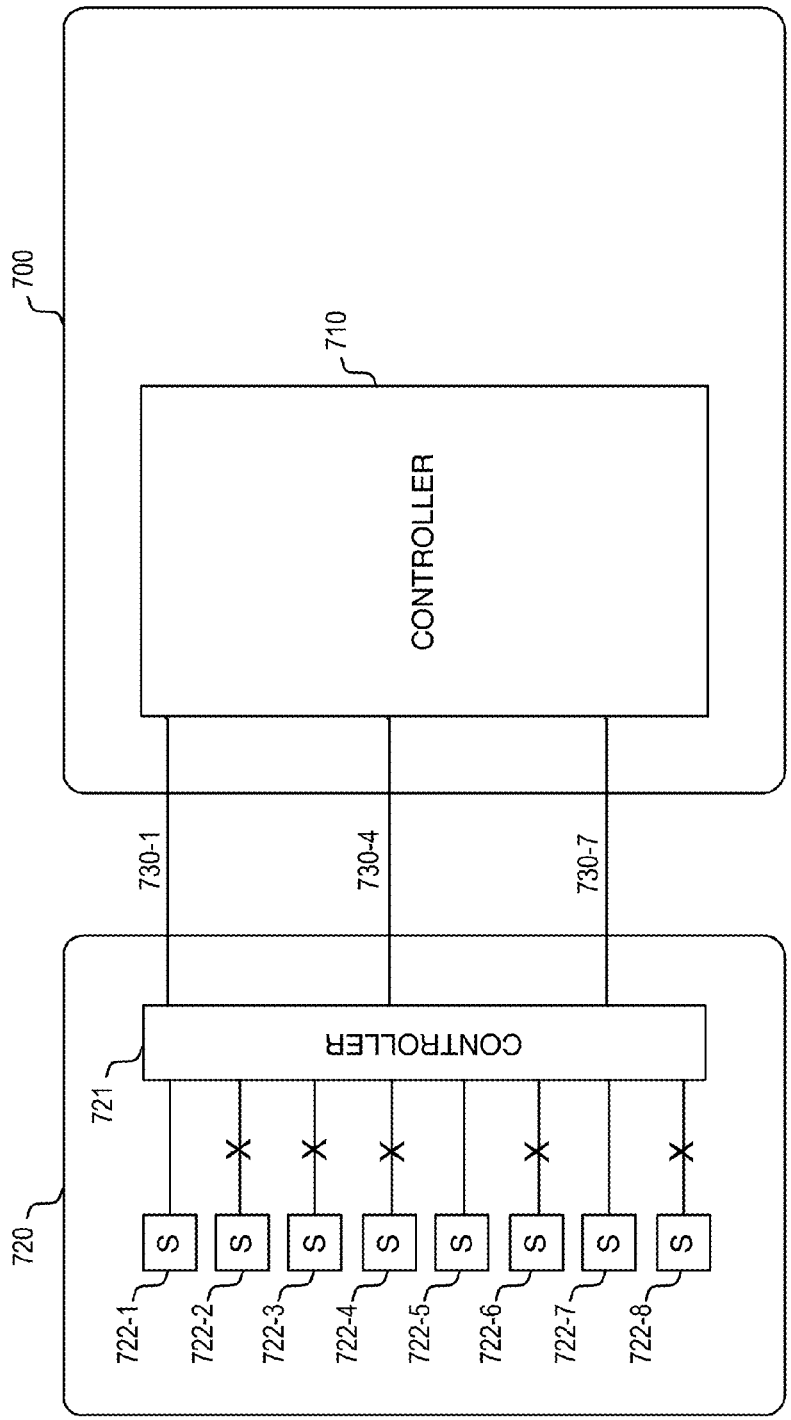
FIG. 7 illustrates an example embodiment of a configuration of a set of sensor channels between a wireless node and a sensor module unit.

FIG. 7 illustrates an example embodiment of the configuration of a set of sensor channels between a sensor module unit and a wireless node. As illustrated, wireless node 700 includes controller 710, while sensor module unit 720 includes controller 721. Controller 710 in wireless node 700 and controller 721 in sensor module unit 720 are configured to communicate using a universal sensor interface such as that described above.

In this example, assume that sensor module unit 720 includes eight sensors 722-1 to 722-8 (e.g., four pulse sensors for measuring utility consumption, one temperature sensor, one air quality sensor, one humidity sensor and one light sensor), which can represent a standard suite of sensors targeted for school building use. After sensor module unit 720 has been attached to wireless node 700 via a universal sensor interface, channels of data associated with a first subset of the suite of eight sensors 722-1 to 722-8 can be activated, while channels of data associated with a second subset of the suite of eight sensors 722-1 to 722-8 can be deactivated.

For example, assume that sensors 722-1 to 722-4 are pulse sensors, sensor 722-5 is a temperature sensor, sensor 722-6 is an air quality sensor, sensor 722-7 is a humidity sensor, and sensor 722-8 is a light sensor. As illustrated, sensor module unit 720 can be configured such that channels of data associated with a first subset of sensors, including pulse sensor 722-1, temperature sensor 722-5 and humidity sensor 722-7 are activated. Correspondingly, sensor module unit 720 can be configured such that channels of data associated with a second subset of sensors, including pulse sensors 722-2 to 722-4, air quality sensor 722-6 and light sensor 722-8 are deactivated. This example can represent a scenario where the part of the monitored location at which wireless node 700 is installed has only one measurable utility consumption (e.g., water) that requires monitoring along with a need for temperature and humidity sensor readings.

Since channels of data associated with pulse sensors 722-2 to 722-4, air quality sensor 722-6 and light sensor 722-8 have been deactivated, controller 721 would report to controller 710 that controller 721 has only three data values for retrieval. These three data values are represented by the sensor channels 730-1, 730-4 and 730-7 that are passed between controller 721 in sensor module unit 720 to controller 710 in wireless node 700 over the universal sensor interface. As this example illustrates, the configuration of the activated/deactivated sensor channels of data enables customization to meet the particular needs of a particular part of a monitored location.

As noted, the wireless node can be coupled to a plurality of sensor module units. Different subsets of sensor channels of data in each sensor module unit can be activated/deactivated as needed. In combination, a customized set of sensor channels of data across the plurality of sensor module units can be activated/deactivated as needed.

Figure 8:
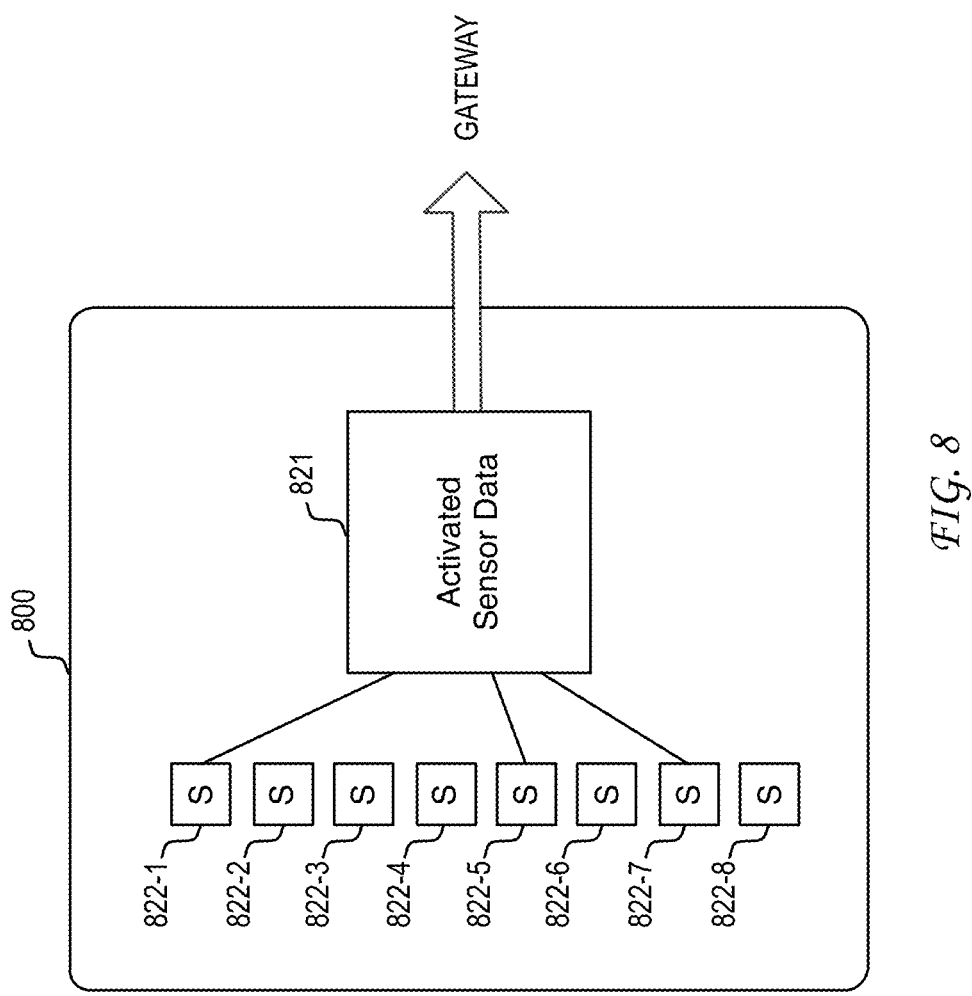
FIG. 8 illustrates a framework of the relative activation of sensors in the wireless sensor network.

Here, it should be noted that the relative activation of sensor channels of data in the wireless sensor network can be accomplished in a variety of ways. FIG. 8 illustrates a framework of the relative activation of sensor channels of data in the wireless sensor network. In this illustration, wireless sensor node unit 800 can represent a combination of a sensor module unit and a wireless node. In a manner similar to FIG. 7, example wireless sensor node unit 800 is illustrated as containing eight sensors 822-1 to 822-8. In a configured mode of operation of wireless sensor node unit 800, channels of data associated with a first subset of sensors is activated and channels of data associated with a second subset of sensors is deactivated or managed in a manner different from the channels of data associated with the first subset of sensors. The first subset of sensors, which includes sensor 822-1, sensor 822-5 and sensor 822-7, produces activated sensor data 821. Activated sensor data 821 is transmitted to a gateway device via a wireless transceiver.

The selective transmission of activated sensor data 821 to a gateway device is characteristic of the configured mode of operation of wireless sensor node unit 800. The configured mode of operation can be effected in a number of different ways.

In one embodiment, the configured mode of operation can be effected such that the second subset of sensors do not perform any sensor measurements. In this embodiment, one or more components associated with the second subset of sensors can enter an unpowered or other energy saving state such that power consumption is minimized. In general, maximizing power savings by powering down any unneeded component would maximize the lifetime of internal powering solutions (e.g., battery power). This extended lifetime would lower the maintenance costs of the wireless sensor network in delaying action by a service technician (e.g., replacing an internal battery).

In another embodiment, the configured mode of operation can be effected such that a controller in the sensor module unit is prevented from collecting or otherwise retrieving data from the second subset of sensors. In one example, the one or more of the second subset of sensors can remain powered, but the controller in the sensor module unit does not collect or otherwise retrieve data from the second subset of sensors. In one scenario, the interface between the controller and a sensor in the second subset of sensors can be deactivated. FIG. 7 provides an illustration of this scenario, where the interfaces between controller 721 and sensor 722-2, sensor 722-3, sensor 722-4, sensor 722-6 and sensor 722-8 are deactivated.

In another embodiment, the configured mode of operation can be effected such that a controller in the sensor module unit has obtained sensor data from the second subset of sensors, but does not forward the obtained sensor data to the wireless node via the wired interface. In one example, the second subset of sensors can continue to take sensor measurements and forward those sensor measurements to the controller in the sensor module unit. The controller can then be configured to forward only the sensor measurements from the first subset of activated sensors to the wireless node.

In yet another embodiment, the configured mode of operation can be effected such that the controller in the wireless node has obtained sensor data from the second subset of sensors, but does not forward the obtained sensor data to the gateway via the wireless transceiver. In one example, the sensor module unit can continue to take sensor measurements and forward those sensor measurements to the controller in the wireless node. The controller can then be configured to forward only the sensor measurements from the first subset of activated sensors to the gateway. This embodiment is useful where wireless bandwidth in the wireless sensor network is of concern. Effectively, the controller in the wireless node can be configured to filter the sensor channels that are transmitted to the gateway.

As has been illustrated, the configured mode of operation of the wireless sensor node unit can limit the transmission of sensor data to the gateway in a variety of ways. In various examples, the limitation effected by the configured mode of operation can influence the operation of the sensors, the operation of the interface between the sensor and the controller in the sensor module unit, the operation of the controller in the sensor module unit, the operation of the universal sensor interface, the operation of the controller in the wireless node, the operation of the wireless transceiver, or the operation of any other component in the sensor data path. The particular mechanism used by the configured mode of operation would be implementation dependent. In general, the configured mode of operation can be designed to limit the collection and/or forwarding of data in the data path originating at the second subset of sensors.

A configured mode of operation can be established based on configuration setup information that is made available to the wireless node from the host system. In one example, the configuration setup information is based on a configuration command generated by a configuration station (e.g., personal computer, tablet, mobile phone, or other computing device), which can be enabled to identify a particular configured mode of operation for the sensor module unit and/or the wireless node.

Figure 9:
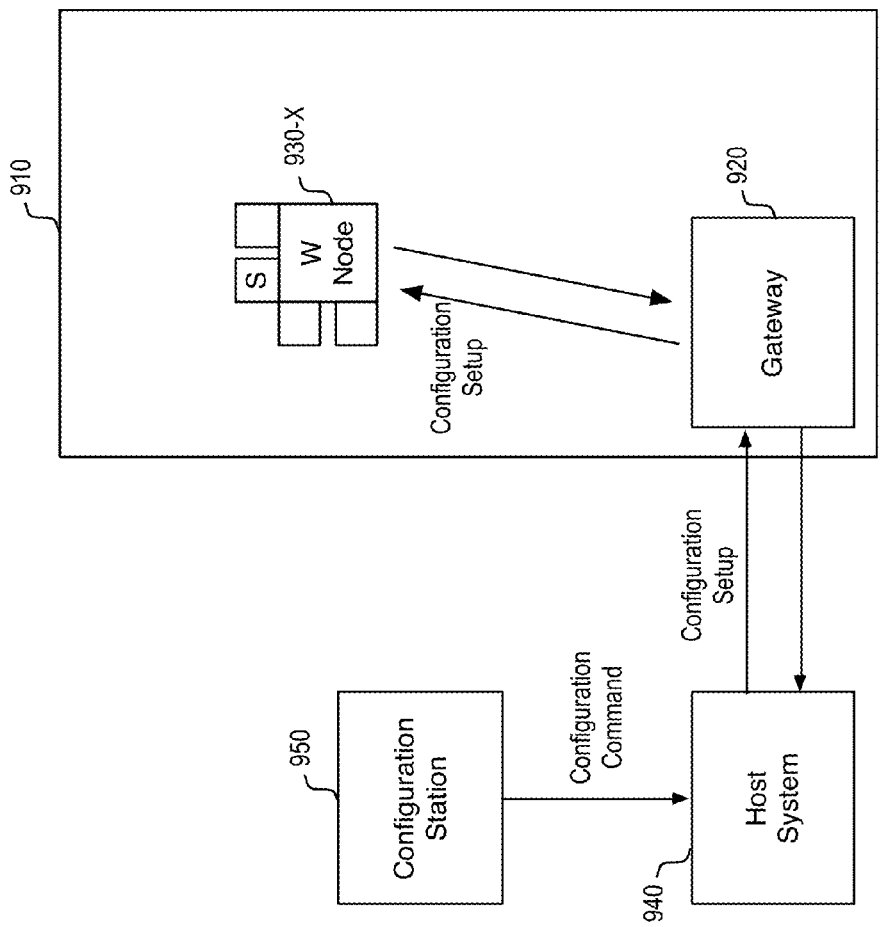
FIG. 9 illustrates a framework for enabling remote configuration of the operation of a wireless sensor network.

FIG. 9 illustrates a framework for enabling remote configuration of the operation of the wireless sensor network at the monitored location. As illustrated, host system 940 can support configuration station 950. In one embodiment, host system 940 provides configuration station 950 with computer readable program code that enables configuration station 950 to render a user interface (e.g., web interface). The user interface enables a user at configuration station 950 to identify a configured mode of operation for the operation of the wireless sensor network. Through the interaction by a user with the user interface presented at configuration station 940, configuration station 950 can generate a configuration command that is transmitted to host system 940. In general, the configuration command can be designed to produce one or more actions that influence or otherwise modify the operation of the wireless sensor network.

In the illustrated example, the configuration command is received by host system 940 and used as the basis for generating configuration setup information that is subsequently transmitted to one or more wireless nodes such as wireless node 930-X. In the general sense, configuration setup information can be used to influence or otherwise modify the operation of any element in a data path between host system 940 and a sensor module unit attached to a wireless node. For example, the generated configuration setup information can be used to influence or otherwise modify the operation of a component within host system 940, gateway 920, wireless node 930-X, and/or a sensor module unit attached to wireless node 930-X.

By this process, configuration station 950 can be used to effect remote configuration of the wireless sensor network. It is a feature of the present disclosure that the remote configuration provides further flexibility in enabling post-installment configuration. Features and capabilities of the wireless sensor network would therefore not be constrained to pre-installed features. Rather, features in the wireless sensor network can be dynamically added or modified after the installation of a base of modular components. Installation and configuration costs of the wireless sensor network are therefore minimized.

Figure 10:
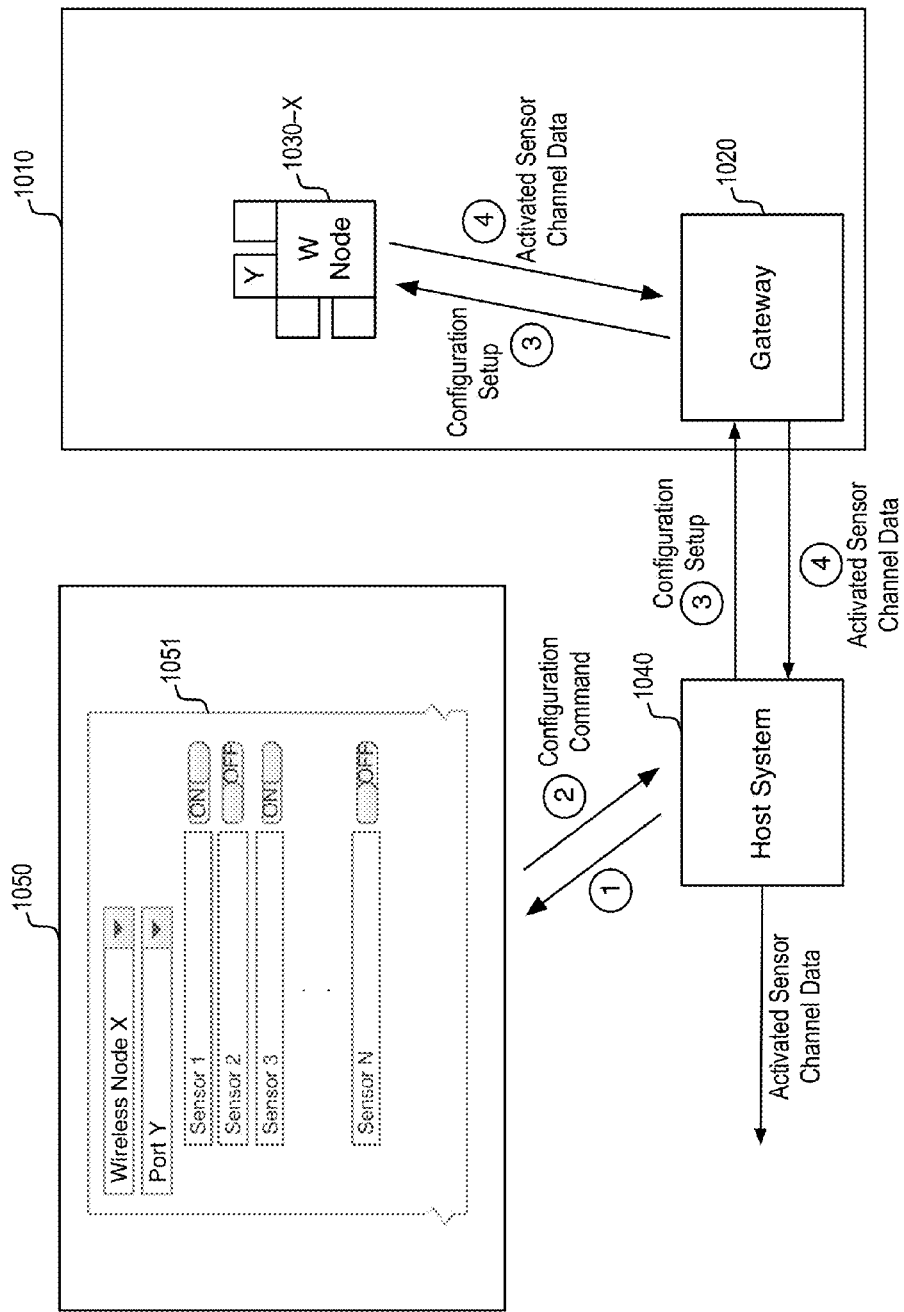
FIG. 10 illustrates an example embodiment of remote configuration for activation of sensor channels of data.

FIG. 10 illustrates an example embodiment of the use of remote configuration for activation of sensor channels of data. As illustrated, configuration station 1050 supports the provision of a user interface 1051 that enables a user to activate/deactivate particular sensor channels of data at monitored location 1010. In one example, a settings module supported by host system 1040 can transmit computer readable program code (communication 1) from a server device to configuration station 1050 that enables configuration station 1050 to render user interface 1051 (e.g., web interface). Through the interaction by the user with user interface 1051 on configuration station 1050, the user can specify the details of particular sensor channels of data that should be activated/deactivated. As noted, this activation/deactivation of sensor channels of data would effect a change in the collection and/or reporting of sensor channels of data by a sensor module unit, a wireless node, a gateway, and/or a host system.

User interface 1051 enables a user to specify a particular wireless node. In various embodiments, the wireless node can be specified using a wireless node ID, a pseudo-name for the wireless node, or any other mechanism that enables individual identification of a wireless node. The specification of a particular wireless node can also be facilitated by a grouping of deployed wireless nodes per monitored location. In the illustrated example of FIG. 10, the identification of "Wireless Node X" would correspond to wireless node 1030-X at monitored location 1010.

After identification of wireless node 1030-X, user interface 1051 would then enable the user to identify a particular port of wireless node 1030-X. For example, where wireless node 1030-X includes four ports that each expose an interface connector for physical attachment to a connector on a sensor module unit, user interface 1051 would enable selection of any of the four ports. In the illustrated example of FIG. 10, the identification of "Port Y" would correspond to the sensor module unit attached to port Y of wireless node 1030-X at monitored location 1010.

Next, user interface 1051 would enable the user to specify, for each included sensor in the sensor module unit attached to port Y of wireless node 1030-X, whether that sensor channel of data is activated or deactivated. In the illustrated example of FIG. 10, the user has activated the channel of data associated with Sensor 1, deactivated the channel of data associated with Sensor 2, activated the channel of data associated with Sensor 3, . . . , and deactivated the channel of data associated with Sensor N.

Through the interaction by a user with user interface 1051, an activation/deactivation status of each sensor channel of data in the sensor module unit attached to port Y of wireless node 1030-X would be specified. The specification of the activation/deactivation status of each sensor channel of data can then be returned as a configuration command (communication 2) to host system 1040. In one embodiment, host system 1040 can store an activation/deactivation status for each sensor channel of data in a database based on the received configuration command. In one example, the activation/deactivation status for a sensor channel of data is stored in accordance with an identifier based on a gateway identifier, a wireless node identifier, a port identifier and a sensor identifier.

Based on the remotely-configured activation/deactivation status, host system 1040 can then generate configuration setup information for the configuration of the sensor channels of data in the sensor module unit attached to port Y of wireless node 1030-X at monitored location 1010. In one embodiment, host system 1040 would transmit the generated configuration setup information (communication 3) to wireless node 1030-X via gateway 1020. The configuration setup information can then be used by wireless node 1030-X in configuring the operation of the sensor module unit attached to port Y and/or the operation of wireless node 1030-X. After configuration, wireless node 1030-X would transmit activated sensor channels of data (communication 4) back to host system 1040 for subsequent distribution.

As noted above, the activation/deactivation of individual sensor channels of data can effectively be performed at different parts of the sensor module unit and/or wireless node. The particular mechanism by which the configuration setup information would be used would therefore be implementation dependent. For example, the configuration setup information can be used to influence the operation of the sensors, the operation of the interface between the sensor and the controller in the sensor module unit, the operation of the controller in the sensor module unit, the operation of the universal sensor interface, the operation of the controller in the wireless node, the operation of the wireless transceiver, or the operation of any other component in the sensor data path.

In one embodiment, the configuration setup information would not produce a change in the transmissions by wireless node 1030-X, which can forward sensor channels of data from all sensors. In this example, the configuration setup information can be used by gateway 1030 and/or host system 1040 to influence the operation of gateway 1030 and/or host system 1040 in forwarding only a select set of sensor channels of data that have been activated. This selective transmission of sensor channels of data can support a billing model where customers pay per sensor channel stream of data that is exposed by the host system to the customer.

As has been described, user interface 1051 on configuration station 1050 enables a user to remotely configure an activation/deactivation status for every sensor channel of data associated with every sensor in every sensor module unit attached to every wireless node at the monitored location. Here, the activation/deactivation status specified at configuration station 1050 produces a change in the collection and/or processing of sensor channels of data that are performed by one or more of a sensor module unit, a wireless node, a gateway, and a host system. This change in the collection and/or processing of sensor channels of data at units remote from configuration station 1050 enables a scalable wireless sensor network solution that reduces installation and maintenance costs as the wireless sensor network evolves to address changing sensor application needs at a particular monitored location.

The example embodiment illustrated in FIG. 10 represents one example application of the remote configuration framework presented in FIG. 9. Additional applications of the remote configuration framework are now described.

Figure 11:
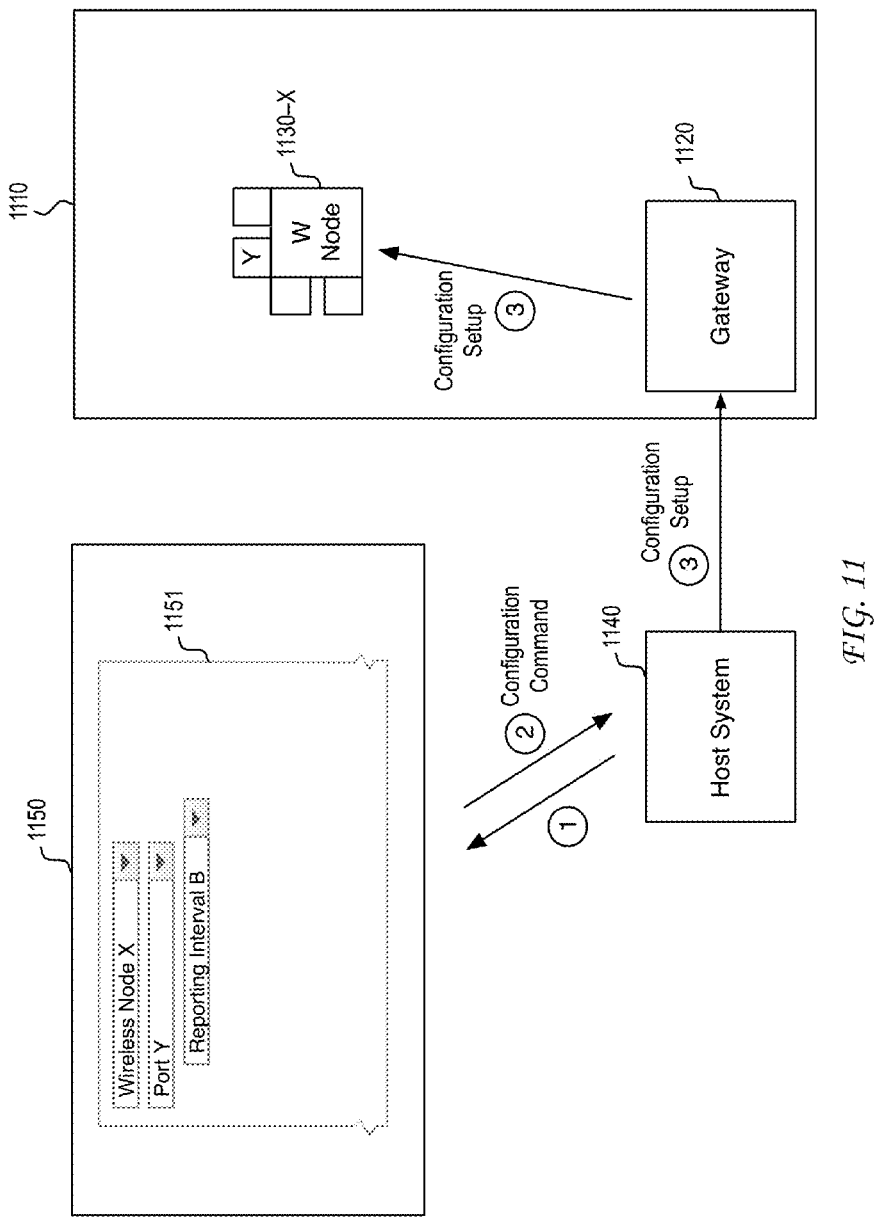
FIG. 11 illustrates an example embodiment of a remote configuration of a reporting interval at a monitored location.

FIG. 11 illustrates an example embodiment of a remote configuration of a reporting interval at a monitored location. As illustrated, configuration station 1150 supports the provision of user interface 1151 that enables a user to specify data reporting intervals for individual sensor module units installed at monitored location 1110. In one example, a settings module supported by host system 1140 can transmit computer readable program code (communication 1) from a server device to configuration station 1150 that enables configuration station 1150 to render user interface 1151. Through the interaction by the user with user interface 1151 on configuration station 1150, the user can specify the data reporting frequency for particular sensor module units, which effects a change in the type of processing performed by sensor module units, wireless nodes and/or a gateway device.

User interface 1151 enables a user to specify a particular wireless node in a manner similar to that described with reference to FIG. 10. In the illustrated example of FIG. 11, the identification of "Wireless Node X" would correspond to wireless node 1130-X in monitored location 1110.

After identification of wireless node 1130-X, user interface 1151 would then enable the user to identify a particular port of wireless node 1130-X. For example, where wireless node 1130-X includes four ports that each expose an interface connector for physical attachment to a connector on a sensor module unit, user interface 1151 would enable selection of any one of the four ports. In the illustrated example of FIG. 11, the identification of "Port Y" would correspond to the sensor module unit attached to port Y of wireless node 1130-X at monitored location 1110.

Next, user interface 1151 would enable the user to specify, for the sensor module unit attached to port Y of wireless node 1030-X, a defined sensor data reporting interval. For example, the user can be given different options regarding a sensor data reporting interval such as every 10 minutes, every 15 minutes, every 30 minutes, or any other defined time period interval. In the illustrated example of FIG. 11, the user has selected Reporting Interval B.

Through the interaction by a user with user interface 1151, a data reporting interval for the sensor module unit attached to port Y of wireless node 1130-X in monitored location 1110 would be specified. The specification of the data reporting interval for the sensor module unit can then be returned as a configuration command (communication 2) to host system 1140. In one embodiment, a specified data reporting interval for each sensor module unit can be stored in a database based on the received configuration command. In one example, the specified data reporting interval is stored in accordance with an identifier based on a gateway identifier, a wireless node identifier, and a port identifier.

Based on the remotely-configured data reporting interval, host system 1140 can then generate configuration setup information for the configuration of the wireless nodes in monitored location 1110. In one embodiment, host system 1140 would transmit the generated configuration setup information (communication 3) to wireless node 1130-X via gateway 1120. The configuration setup information can then be used by wireless node 1130-X in configuring the reporting of sensor data from the sensor module unit attached to port Y of wireless node 1130-X. After configuration, wireless node 1130-X would perform periodic sensor data reports from the sensor module unit attached to port Y of wireless node 1130-X in accordance with the specified reporting interval.

Here, it should be noted that the data collection reporting applied on a per sensor module unit basis is for illustration purposes only. More generally, the data reporting interval can be specified at whatever level of granularity is required for the needs of monitored location 1110. In one embodiment, a user can specify that the same data reporting interval be applied to all wireless nodes at monitored location 1110. In another embodiment, a user can specify separate data reporting intervals for each wireless node, wherein all sensor module units for a particular wireless node would share the same data reporting interval. In another embodiment, the data reporting interval can be performed on a per sensor channel of data basis such that a first sensor in a sensor module unit would report sensor data to a wireless node at a different frequency than a second sensor in that same sensor module unit. In this example, the specified data reporting interval is stored in accordance with an identifier based on a gateway identifier, a wireless node identifier, a port identifier and a sensor identifier.

The different granularity of control provided with respect to the data reporting interval is designed to address differences in monitoring across monitored location 1110. There may exist, for example, certain parts of monitored location 1110 that are more or less critical than others, certain sets of sensors that are more or less critical than others, and/or certain individual sensors that are more or less critical than others. Through the use of configuration station 1150, a user can specify data reporting intervals that are customized for different sensors, different sensor module units, different wireless nodes, and/or other groupings of wireless sensor network elements that share a reporting interval characterization.

Regardless of the particular level of granularity used to specify one or more data reporting intervals through user interface 1151, the generated configuration command(s) would form the basis of configuration setup information that is transmitted from host system 1140 to gateway 1120. Depending on the granularity of the control effected using user interface 1151, gateway 1120 can transmit configuration setup information that is applicable to all or part of the wireless sensor network. In one example, the receipt of the configuration setup information by wireless node 1130-X would cause wireless node 1130-X to configure the intervals at which it would communicate with all or part of the connected sensor module units to enable sensor data reports for one or more sensors.

As has been described, user interface 1151 on configuration station 1150 enables a user to remotely configure a data reporting interval for every sensor channel of data produced by every sensor in every sensor module unit attached to every wireless node at the monitored location. Here, the data reporting interval specified at configuration station 1150 produces a change in the collection and/or processing of sensor channels of data at remote units such as a sensor module unit and a wireless node. This change in the collection and/or processing of sensor channels of data at units remote from configuration station 1150 enables a scalable wireless sensor network solution that reduces installation and maintenance costs as the wireless sensor network evolves to address changing sensor application needs at a particular monitored location.

Figure 12:
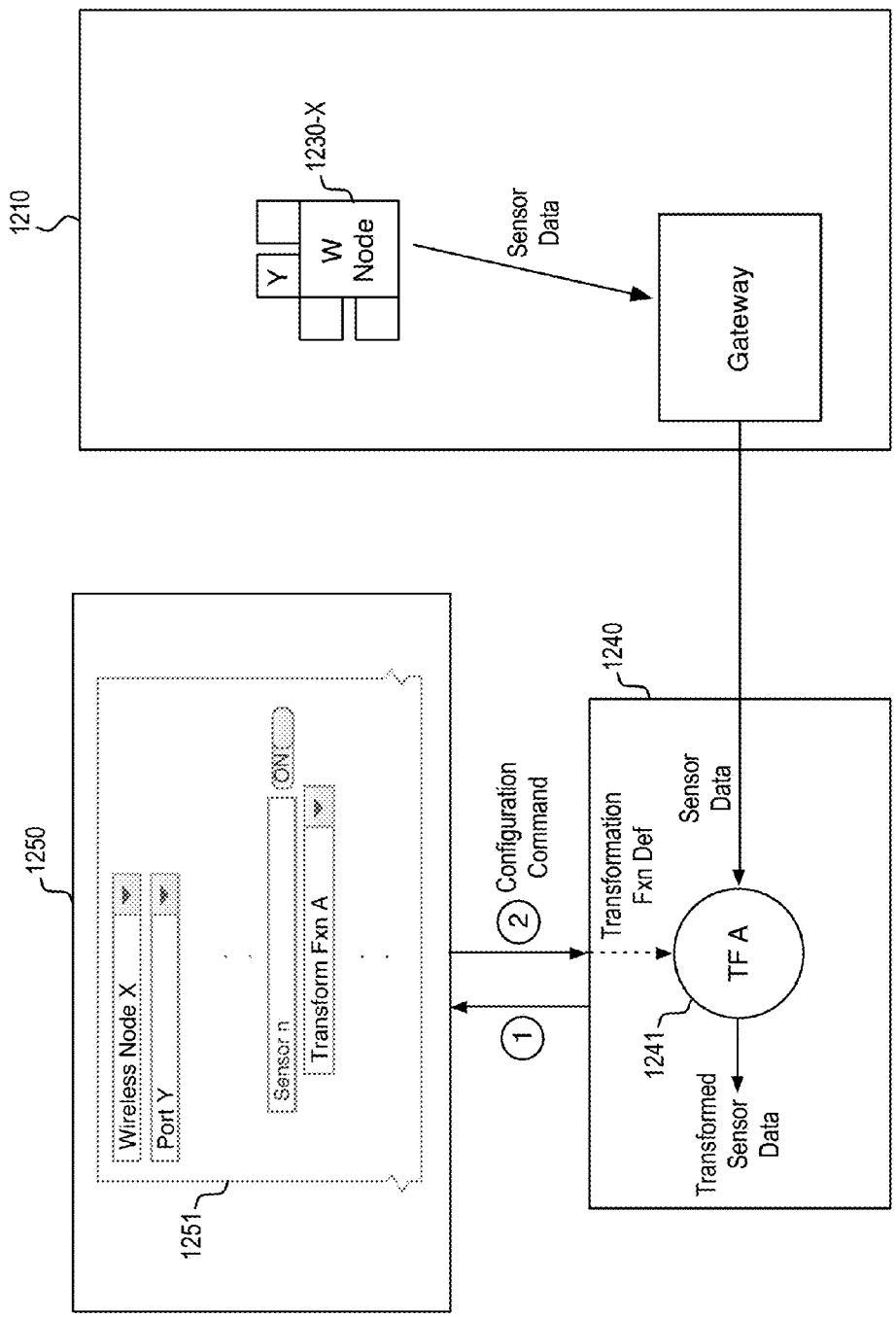
FIG. 12 illustrates an example embodiment of a remote configuration of a transformation function for a sensor channel of data.

FIG. 12 illustrates an example embodiment of a remote configuration of a transformation function for a sensor channel of data. As illustrated, configuration station 1250 supports the provision of user interface 1251 that enables a user to specify a transformation function for a particular sensor channel of data. In one example, a settings module supported by host system 1240 can transmit computer readable program code (communication 1) from a server device to a client device that enables configuration station 1250 to render user interface 1251. Through the interaction by the user with user interface 1251 on configuration station 1250, the user can specify the details of a particular transformation function to be applied to a particular sensor channel of data, which effects a change in the type of processing performed by host system 1240.

User interface 1251 enables a user to specify a particular wireless node in a manner similar to that described with reference to FIG. 10. In the illustrated example of FIG. 12, the identification of "Wireless Node X" would correspond to wireless node 1230-X in monitored location 1210.

After identification of wireless node 1230-X, user interface 1251 would then enable the user to identify a particular port of wireless node 1230-X. For example, where wireless node 930-X includes four ports that each expose a connector interface for physical attachment to a connector on a sensor module unit, user interface 951 would enable selection of any one of the four ports. In the illustrated example of FIG. 12, the identification of "Port Y" would correspond to the sensor module unit attached to port Y of wireless node 1230-X at monitored location 1210.

Next, user interface 1251 would enable the user to activate a transformation function for the sensor channel of data corresponding to a particular sensor in the sensor module unit attached to port Y of wireless node 1230-X at monitored location 1210. In the illustrated example of FIG. 12, the user has activated the transformation function for sensor "n" in the sensor module unit attached to Port Y. As part of this process, user interface 1251 can also enable the user to specify a particular transformation function for the sensor channel corresponding to sensor "n." In one embodiment, user interface 1251 can provide a pre-defined listing of transformation functions that can be applied to the sensor channel of data. In the illustrated example, the user has activated Transformation Function A for the sensor channel of data corresponding to sensor "n." As would be appreciated, various user-interface mechanisms can be used to enable a user to customize a transformation function for the selected sensor channel of data.

Figure 13:
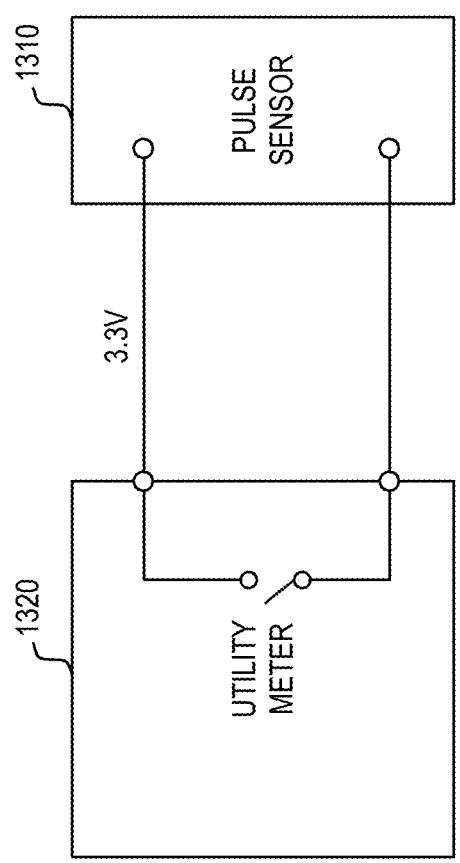
FIG. 13 illustrates an example embodiment of a pulse sensor.

To illustrate the value of a specified transformation function, consider the example of a pulse sensor in FIG. 13. As illustrated, pulse sensor 1310 can be coupled to utility meter 1320 via a pair of conductors. The actual wired interface between pulse sensor 1310 and utility meter 1320 can vary depending on the type of utility meter that is present. As illustrated, pulse sensor 1310 can be configured to provide 3.3V on a first conductor. Utility meter 1320 includes a dry contact relay that would successively relay the 3.3V provided by pulse sensor 1310 and then open the relay. In one example, a first state of the relay can correspond to a first part of a disk rotation, while a second state of the relay can correspond to a second part of a disk rotation. Where the first state of the relay corresponds to a first half of the disk rotation and the second state of the relay corresponds to a second half of the disk rotation, then a full rotation of the disk would encounter two changes in state of the sensed value at pulse sensor 1310. As would be appreciated, utility meters can be defined such that a different number of state changes in the relay can be produced for a single disk rotation. Thus, while pulse sensor 1310 can measure the number of changes in the state of the relay at utility meter 1320 over a period of time, pulse sensor 1310 would not know how many disk rotations actually occurred at utility meter 1320 in that period of time. Without knowledge of the number of disk rotations that actually occurred at utility meter 1320, information about the amount of a utility service consumed would not be available.

In the present disclosure, it is recognized that the same pulse sensor can be used to measure relay transitions in many different types of utility meters having different rates of correspondence between relay transitions and disk rotations. In converting the measured number of relay transitions into useful information, a transformation function can be defined to perform the conversion of sensor data into sensor information.

Consider a simple example of a utility meter that has four relay transitions per disk rotation. In this example, a first transformation function (divide by four) can be a defined such that the number of detected relay state transitions by the pulse sensor is divided by four to produce a corresponding number of disk rotations. The number of disk rotations could then be converted by a second transformation function into an actual consumption quantity of the utility measured by the utility meter. As would be appreciated, the combination of the first and second transformation function can be defined to match the particular characteristics of the utility meter being monitored to produce useful information.

In the present disclosure, it is recognized that the definition of the transformation function for a pulse sensor effectively represents another form of remote configuration of the sensor module unit, wherein the configuration need not be performed prior to installation of the sensor module unit. In fact, this level of configuration can be performed without modification of the sensor module unit itself, further minimizing installation and maintenance costs. For example, if the utility meter at the monitored location is changed such that the number of relay transitions per disk rotation changes, then the transformation function applicable to that particular sensor channel of data can be modified without requiring a replacement or modification of the sensor module unit at the monitored location.

Through the interaction by a user with user interface 1251, a transformation function for sensor "n" of the sensor module unit attached to port Y of wireless node 1230-X at monitored location 1210 would be specified. The specification of the transformation function can then be returned as a configuration command (communication 2) to host system 1240. In one embodiment, a transformation function definition is stored in a database for retrieval and application by host system 1240 to the sensor channel produced by sensor "n" of the sensor module unit attached to port Y of wireless node 1230-X. In one example, the transformation function definition is stored in accordance with an identifier based on a gateway identifier, a wireless node identifier, a port identifier and a sensor identifier.

In operation, host system 1240 would receive a sensor channel of data generated by sensor "n" in the sensor module unit attached to port Y of wireless node 930-X. Host system 1240 would then retrieve the definition of Transformation Function A stored in association with that sensor channel of data, apply Transformation Function A to the sensor channel of data using processing component 1241, and produce a transformed sensor channel of data. The transformed sensor channel of data can then be stored and distributed by host system 1240 as usable sensor information.

As described, user interface 1251 on configuration station 1250 enables a user to remotely configure a transformation function for every sensor in every sensor module unit attached to every wireless node at the monitored location. By this specification, effective configuration and/or reconfiguration of the sensor can be performed after installation of the sensors at the monitored location. The effective configuration and/or reconfiguration of the sensors through specification of applicable transformation functions enables the host system to generate usable information with minimal changes to the deployed wireless sensor network in the monitored location.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A system, comprising:
a wireless network node at a monitored location, the wireless network node including a plurality of pulse sensors and a wireless transceiver, a first of the plurality of pulse sensors connected to a first utility meter via first wiring for receipt of state change signals from the first utility meter, a second of the plurality of pulse sensors connected to a second utility meter via second wiring for receipt of state change signals from the second utility meter;
a gateway device at the monitored location, the gateway device configured to receive measurements by the plurality of pulse sensors via wireless communication with the wireless network node; and
one or more servers at a location remote from the monitored location, the one or more servers configured to communicate with the gateway device via a communication network to receive the measurements by the plurality of pulse sensors, the one or more servers storing a first transformation function in association with a first identifier for a first sensor channel of data associated with measurements by the first of the plurality of pulse sensors, wherein the first transformation function includes a first pulse conversion variable provided by a user to the one or more servers via a first user interface, the first pulse conversion variable applied by the one or more servers to convert a first number of detected state change signals from the first utility meter to a first amount of utility usage for a transformed first sensor channel of data, and storing a second transformation function in association with a second identifier for a second sensor channel of data associated with measurements by the second of the plurality of pulse sensors, wherein the second transformation function includes a second pulse conversion variable provided by a user to the one or more servers via a second user interface, the second pulse conversion variable applied by the one or more servers to convert a second number of detected state change signals from the second utility meter to a second amount of utility usage for a transformed second sensor channel of data, the one or more servers further configured to transmit the transformed first sensor channel of data and the transformed second sensor channel of data to a customer.

2. The system of claim 1, wherein the monitored location is a building.

3. The system of claim 1, wherein the wireless communication is based on IEEE 802.15.4.

4. The system of claim 1, wherein the wireless network node includes a wireless node and a sensor module having the plurality of pulse sensors, the sensor module connected to the wireless node via a wired data communication interface having a serial data connection and a serial clock connection.

5. The system of claim 1, wherein the first pulse conversion variable is an integer used as a multiplier or divider in the first transformation function.

6. The system of claim 1, wherein the first utility meter is one of a water meter, gas meter, and electricity meter.

7. The system of claim 1, wherein the first pulse conversion variable is different from the second pulse conversion variable.

8. A system, comprising:
one or more servers configured to receive from a user, via a user interface presented to the user, a first pulse conversion variable and a second pulse conversion variable; and
a database configured to store a first transformation function based on the first pulse conversion variable in association with a first identifier for a first sensor channel of raw measurement data generated by a first pulse sensor in a first wireless network node at a monitored location, the first pulse sensor connected to a first utility meter via first wiring for receipt of state change signals from the first utility meter, and a second transformation function based on the second pulse conversion variable in association with a second identifier for a second sensor channel of raw measurement data generated by a second pulse sensor in a second wireless network node at a monitored location, the second pulse sensor connected to a second utility meter via second wiring for receipt of state change signals from the second utility meter, wherein the first wireless network node and the second wireless network node communicate with a gateway device at the monitored location via wireless communication,
the one or more servers configured to communicate with the gateway device via a communication network, the one or more servers configured to apply the first pulse conversion variable in the first transformation function to convert a first number of detected state change signals from the first utility meter to a first amount of utility usage to produce a first transformed sensor channel of measurement data, and configured to apply the second pulse conversion variable in the second transformation function to convert a second number of detected state change signals from the second utility meter to a second amount of utility usage to produce a second transformed sensor channel of measurement data, the one or more servers further configured to transmit the first transformed sensor channel of measurement data and the second transformed sensor channel of measurement data to a customer.

9. The system of claim 8, wherein the one or more servers are configured to transmit computer readable program code that enables a customer device to render a user interface that enables the customer to specify the first pulse conversion variable and the second pulse conversion variable.

10. The system of claim 8, wherein the first transformation function is stored in association with one or more of an identifier of the gateway device, an identifier of the first wireless network node, and an identifier of the first pulse sensor.

11. The system of claim 8, wherein the first pulse conversion variable is an integer used as a multiplier or divider in the first transformation function.

12. The system of claim 8, wherein the first pulse conversion variable is different from the second pulse conversion variable.

13. A method, comprising:
receiving, by one or more servers from a device associated with a customer, a first specification of a first pulse conversion variable for a first pulse sensor in a first wireless network node at a monitored location, and a second specification of a second pulse conversion variable for a second pulse sensor in a second wireless network node at the monitored location, wherein first state change signals derived from measurements by the first pulse sensor of a first utility meter connected to the first pulse sensor via first wiring and second state change signals derived from measurements by the second pulse sensor of a second utility meter connected to the second pulse sensor via second wiring are delivered by the first wireless network node and second wireless network node, respectively, to a gateway device at the monitored location via wireless communication;
storing, by the one or more servers, a first transformation function based on the first pulse conversion variable in association with a first identifier for the first pulse sensor in the first wireless network node, and a second transformation function based on the second pulse conversion variable in association with a second identifier for the second pulse sensor in the second wireless network node;
receiving, by the one or more servers, the first state change signals and the second state change signals from the gateway device via network communication;
transforming, by the one or more servers, a first number of the first state change signals to a first amount of utility usage using the first pulse conversion variable in the first transformation function, and a second number of the second state change signals to a second amount of utility usage using the second pulse conversion variable in the second transformation function; and
transmitting the first amount of utility usage of the first utility meter and the second amount of utility usage of the second utility meter to the customer.

14. The method of claim 13, wherein the monitored location is a building.

15. The method of claim 13, wherein the storing comprises storing the first transformation function in association with an identifier of the gateway device, an identifier of the first wireless network node, and an identifier of the first of the plurality of sensors.

16. The method of claim 13, further comprising transmitting a description of a predefined transformation function to the customer device as an option for selection in a user interface.

17. The method of claim 13, wherein the network communication is via the Internet.

18. The method of claim 13, wherein the first pulse conversion variable is an integer used as a multiplier or divider in the first transformation function.

19. The method of claim 13, wherein the first pulse conversion variable is different from the second pulse conversion variable.

20. The method of claim 13, wherein the first utility meter is one of a water meter, gas meter, and electricity meter.

* * * * *